United States Patent Office 3,630,937
Patented Dec. 28, 1971

3,630,937
SULFONATED POLYSTYRENE COMPOSITIONS
AND METHODS OF TREATING BOILER WATER
Raymond N. Baum, Pittsburgh, Edward N. Rebis, Coraopolis, and Phillip B. Reilly, Pittsburgh, Pa., assignors to Calgon Corporation, Pittsburgh, Pa.
No Drawing. Filed May 6, 1968, Ser. No. 727,005
Int. Cl. C02b 1/18, 5/06
U.S. Cl. 252—181        14 Claims

ABSTRACT OF THE DISCLOSURE

Compositions and methods for boiler water treatment are disclosed. The compositions contain a sulfonated polystyrene to act as a dispersive; in addition, they may contain a chelating agent such as $Na_3NTA$. A useful composition combines the polymer with a silicate and/or a phosphate.

BACKGROUND OF THE INVENTION

The accumulation of sludge in boilers over a period of time has long been a problem in the boiler water treatment art. Solid sludge formation causes decreases in heat transfer efficiency and other problems familiar to those working in the art, such as contaminant carry-over, and priming. Boiler water dispersants have been used for many years to reduce sludge accumulation. They do not generally prevent precipitation of solids, but cause them to be dispersed throughout the boiler water rather than deposited on the heat transfer surfaces. Many dispersants used in the past have been chosen more for their low price and ready availability than for their efficiency. Examples of boiler water dispersants widely used in the past are tannin, lignin and lignosulfonates. Such dispersants are not designed to act upon the zeta potential and other characteristics on suspended matter which affect dispersability.

Dispersants are expected to act upon the precipitation products formed as a result of adding scale inhibitors and the like to boilers. In combination with other insolubles which may accumulate in boilers, the total solid content in boiler water which is not in form of scale is referred to as "sludge," and the dispersant may be called a "sludge conditioner."

SUMMARY OF THE INVENTION

We have found that both the dispersant and the other additives may be chosen to control the sludge characteristics very favorably. The compositions we use yield a highly mobile, free-flowing sludge which can easily be removed from the boiler.

Although sodium nitrilo triaceate is known as a sequestering and/or chelating agent, it has not heretofore been used in combination with sodium polystyrene sulfonate. Both the chelating agent and the dispersant are able to function better together than they do alone.

We also find that the dispersing action of sodium polystyrene sulfonate enhances the function of phosphates and/or silicates added to the boiler for their known functions, respectively, of scale inhibiting. Our compositions tend to form insolubles which are least attracted to the boiler surface and which are therefore most easily dispersed by polystyrene sulfonate.

We have found that sodium polystyrene sulfonate is very effective as a boiler water dispersant and sludge conditioner because it substantially affects the zeta potential of the suspended matter. Since much of the suspended matter, or sludge, is purposely formed, the additions may be controlled so as to form solids particularly suited to treatment with sodium polystyrene sulfonate. We have found that the presence of a chelating agent such as NTA (nitrilo triacetic acid), EDTA (ethylenediamine tetraacetic acid) or their sodium salts in the boiler water at the same time as the sulfonated polystyrene greatly inhibits not only the deposition of boiler water sludge but also its formation. Reference is made to Table I for a demonstration of the effect of sulfonated polystyrene on the zeta potential of boiler water sludge.

All samples in Table I were on boiler water taken from a commercial boiler at the temperature noted and with the concentration of the various dispersants noted.

In the table, EM means electrophoretic mobility and ZP means zeta potential.

TABLE I
Zeta potential on the boiler water samples—water, Vulcan DeTining Corp.

| Sample | Conc. | Temp. | Volt. | Charge | Time | EM | ZP |
|---|---|---|---|---|---|---|---|
| Water | | 28° | 107 | (—) | 41.3 | 28.9 | 36.8 |
| Do | Plus 20 p.p.m. hydrolyzed polyacrylamide (A) | 28° | 107 | (—) | 41.9 | 28.0 | 36.0 |
| Do | Plus 20 p.p.m. sulfonated polystyrene | 25° | 107 | (—) | 31.9 | 36.5 | 46.7 |
| Do | Plus 20 p.p.m. hydrolyzed polyacrylamide (B) | 25° | 107 | (—) | 42.7 | 27.4 | 35.0 |
| Water 100° C. for 20 min. then lowered to 25° C | do | 25° | 107 | (—) | 46.2 | 25.2 | 32.3 |
| Water 100° C. for 20 min. then lowered to 2 p.p.m. | Plus 20 p.p.m. sulfonated polystyrene | | 107 | (—) | 40.9 | 28.5 | 36.5 |
| Do | Plus 20 p.p.m. hydrolyzed polyacrylamide (A) | | 107 | (—) | 40.0 | 29.2 | 37.3 |

NOTE.—The hydrolyzed polyacrylamides (A) and (B) were from different sources.

It may be seen from the above table that the polystyrene sulfonate increase the Zeta potential by about 10 points over the nearest competing dispersive. As is known in the art the Zeta potential is an indication of the total charge on a given particle and is related to the dispersability of the particle. An excellent dispersion of the boiler sludge is therefor achieved. The sludge used in this test had an analysis comprising:

| | Percent |
|---|---|
| $SO_3$ | 1–2 |
| $CO_2$ | 1–2 |
| $P_2O_5$ | 29 |
| $SiO_2$ | 10 |
| Fe+Al oxide | 2–3 |
| CaO | 33 |
| MgO | 15 |
| Ign. loss | 10 |

A treatment consisting of sulfonated polystyrene without the addition of any chelating agent has been performed in the field. In the field trial a boiler having a rated capacity of 60,000 lbs./hour was treated over an 8-month period with the addition of 3 pounds per day of sulfonated polystyrene. At the end of this time, the quantity of sludge present was reduced 50–60%. The characteristics of the sludge changed. It was less adherent, and was removed by water washing. Prior to treatment, tightly adherent deposits had been frequently found in the downcomer tubes and in the mud drum.

When a chelating agent is added to the boiler water along with sulfonated polystyrene, the chelate holds dissolved cations in solution; the polymer suspends and disperses undissolved matter. Examples of useful chellating agents are $Na_3NTA$ and $Na_4EDTA$. We prefer to use sodium nitrilotriacetate. The performance of the polymer is enhanced by the removal of the heavy metal cations from activity in solution. Likewise, the use of phosphate and/or silicate along with sodium polystyrene sulfonate enhances the performance of the polymer; in addition, the insoluble phosphate and/or silicate precipitates formed are easily dispersed by our polymer.

For example, in the presence of sufficient OH alkalinity, a combination consisting of about 58.8% by weight sodium metasilicate pentahydrate, 39.2% sodium metaphosphate, and 2.0% sodium polystyrene sulfonate will form hydroxyapetite $3Ca_3(PO_4)_2 \cdot Ca(OH)_2$ rather than tricalcium phosphate. The hydroxyapetite is far more easily dispersed by the polystyrene sulfonate. Moreover, rather than magnesium hydroxide precipitates, the silicate addition tends to form serpentine $3MgO \cdot 2SiO_2 \cdot 2H_2O$, also a much larger molecule which will be dispersed easily by the sodium polystyrene sulfonate.

Our preferred compositions may be stated as follows:

(a) Combinations of sulfonated polystyrene and phosphate.

Preferred: About 96% sodium metaphosphate and about 4% sodium polystyrene sulfonate.

Preferred range: 5–200 p.p.m. in boiler water (b) Combinations of sulfonated polystyrene, phosphate, and silicate.

Preferred: About 39% sodium metaphosphate, about 59% sodium metasilicate pentahydrate, and about 2% sodium polystyrene sulfonate.

Preferred range: 5–500 p.p.m. in boiler water (c) Combinations of sulfonated polystyrene and chelating agent, with or without antifoam.

Preferred: About 92% sodium nitrilotracetate, about 4% sodium polystyrene sulfonate, and about 4% polypropylene glycol antifoam.

Preferred Range: 2–100 p.p.m. in boiler water

In terms of weight ratios, our compositions may be defined as (a) inorganic phosphate to sodium polystyrene sulfonate in weight ratios of from 1:1 to 300:1, and may include inorganic silicate up to about 1000:1, and (b) chelating agent and sodium polystyrene sulfonate in weight ratios of from about 4:1 to about 500:1 of chelating agent to polymer, which may include up to about 10:1 of an antifoam agent to the polymer.

By an inorganic phosphate we mean to include any alkali metal inorganic phosphate, such as trisodium orthophosphate, disodium orthophosphate, tetrasodium pyrophosphate, pentasodium tripolyphosphate, and sodium metaphosphate. By an inorganic silicate, we intended to include sodium metasilicate pentahydrate, and any other sodium silicate. The molecular weight of the sodium polystyrene sulfonate is of little significance in our invention, although molecular weights of less than about 1000 should be avoided. So long as the polymer is water soluble, there is no maximum molecular weight.

Our compositions should be maintained in the boiler water at concentrations sufficient to provide from about 0.1 p.p.m. to 100 p.p.m. of sodium polystyrene sulfonate. At concentrations less than 0.1 p.p.m., some effect may be noted but in most cases a practical effect will not be obtained. At greater than 100 p.p.m. of polymer, the procedure will, in most boiler waters, tend to become uneconomical, when the sodium polystyrene sulfonate is used alone, the preferred range is 0.1 to 100 p.p.m. based on the boiler water.

We do not intend to be restricted to the above specific illustrations and examples. Our invention may be otherwise variously practiced within the scope of the following claims:

We claim:

1. Composition useful for treating boiler water comprising sodium polystyrene sulfonate and inorganic phosphate, in which the weight ratio of inorganic phosphate to sodium polystyrene sulfonate is from about 1:1 to about 300:1.

2. Composition of claim 1 including inorganic silicate in a weight ratio thereof to sodium polystyrene sufonate up to about 1000:1.

3. Composition of claim 2 in which the phosphate is sodium metaphosphate.

4. Composition of claim 2 in which the silicate is sodium metasilicate pentahydrate.

5. Method of treating boiler water to inhibit scale formation and disperse sludge comprising adding to said boiler water a composition of claim 2 in an amount sufficient to maintain from about 0.1 to 100 p.p.m. of sodium polystyrene sulfonate.

6. Method of treating boiler water to inhibit scale formation and disperse sludge comprising adding to said boiler water about 0.1 p.p.m. to about 400 p.p.m. of a composition of claim 2.

7. Composition useful for treating boiler water comprising, in a weight ratio of from about 4:1 to about 500:1, a chelating agent and sodium polystyrene sulfonate.

8. Composition of claim 7 in which the chelating agent is trisodium nitrilo triacetic acid.

9. Composition of claim 8 including an aniifoam agent.

10. Method of treating boiler water to inhibit scale formation comprising adding thereto about 0.1 to about 500 p.p.m. by weight of a composition of claim 8.

11. Composition of claim 7 in which the chelating agent is tetrasodium ethylenediamine tetrracetic acid.

12. Composition of claim 11 including an antifoam agent.

13. Method of treating boiler water to inhibit scale formation comprising adding thereto of a composition of claim 7 in an amount sufficient to maintain from about 0.1 to 100 p.p.m. of sodium polystyrene sulfonate.

14. Method of treating boiler water comprising adding thereto and maintaining therein about 0.1 to about 100 p.p.m. of sodium polystyrene sulfonate.

References Cited

UNITED STATES PATENTS

| | | | |
|---|---|---|---|
| 2,024,543 | 12/1935 | Smith | 210—23 |
| 2,240,957 | 5/1941 | Münz | 210—58 X |
| 2,396,938 | 3/1946 | Bersworth | 210—58 X |
| 2,533,210 | 12/1950 | Baer | 260—686 X |
| 2,964,467 | 12/1960 | Lambert | 210—58 |
| 3,048,548 | 8/1962 | Martin | 252—351 X |
| 3,184,407 | 5/1965 | Kahler | 210—58 |
| 3,308,065 | 3/1967 | Lesinski | 252—82 |
| 3,368,969 | 2/1968 | Palen | 210—58 |
| 3,463,730 | 8/1969 | Booth | 210—58 |

JOHN T. GOOLKASIAN, Primary Examiner

M. E. McCAMISH, Assistant Examiner

U.S. Cl. X.R.

21—2.7; 210—58; 252—87, 161, 175; 260—607, 669, 686